US009963292B2

(12) United States Patent
Bromley et al.

(10) Patent No.: US 9,963,292 B2
(45) Date of Patent: May 8, 2018

(54) STORAGE BIN AND METHOD OF USE

(71) Applicants: Scott Bromley, Hobbs, NM (US); Ray D. Hardin, Hobbs, NM (US)

(72) Inventors: Scott Bromley, Hobbs, NM (US); Ray D. Hardin, Hobbs, NM (US)

( * ) Notice: Subject to any disclaimer, the term of this patent is extended or adjusted under 35 U.S.C. 154(b) by 108 days.

(21) Appl. No.: 14/740,813

(22) Filed: Jun. 16, 2015

(65) Prior Publication Data
US 2015/0368036 A1    Dec. 24, 2015

Related U.S. Application Data

(60) Provisional application No. 62/014,206, filed on Jun. 19, 2014.

(51) Int. Cl.
| | |
|---|---|
| *B67D 7/06* | (2010.01) |
| *B65D 88/32* | (2006.01) |
| *B65G 65/32* | (2006.01) |
| *B65D 90/02* | (2006.01) |

(52) U.S. Cl.
CPC .......... *B65D 88/32* (2013.01); *B65D 90/02* (2013.01); *B65G 65/32* (2013.01)

(58) Field of Classification Search
CPC ......... B65D 88/32; B65D 90/02; B65G 35/32
USPC ............................ 222/185.1, 181.1; 220/651; 137/192–197
See application file for complete search history.

(56) References Cited

U.S. PATENT DOCUMENTS

| | | | | |
|---|---|---|---|---|
| 3,382,625 A | * | 5/1968 | Kuss .................... | B65D 88/121 220/651 |
| 3,658,211 A | * | 4/1972 | Kitchens .............. | B65D 90/582 105/248 |
| 3,729,121 A | * | 4/1973 | Cannon ................ | B65D 90/623 222/185.1 |
| 4,919,583 A | | 4/1990 | Speakman | |
| 5,080,259 A | * | 1/1992 | Hadley ................. | B28C 7/0069 141/102 |
| 6,401,983 B1 | * | 6/2002 | McDonald ............... | B60P 1/56 220/1.5 |
| 7,252,309 B2 | | 8/2007 | Eng Soon et al. | |
| 7,837,427 B2 | | 11/2010 | Beckel et al. | |
| 8,505,780 B2 | | 8/2013 | Oren | |
| 8,585,341 B1 | | 11/2013 | Oren et al. | |
| 8,622,251 B2 | | 1/2014 | Oren | |
| 8,668,430 B2 | | 3/2014 | Oren et al. | |
| 2003/0034349 A1 | * | 2/2003 | Frey ........................ | E04F 21/02 220/632 |
| 2004/0206646 A1 | * | 10/2004 | Goh ........................ | B01F 5/241 206/321 |
| 2010/0040446 A1 | | 2/2010 | Renyer | |
| 2010/0108711 A1 | * | 5/2010 | Wietgrefe .............. | B65D 88/30 222/1 |

(Continued)

*Primary Examiner* — Jeremy W Carroll
(74) *Attorney, Agent, or Firm* — Sarah Hegi Simpson; McWhorter, Cobb & Johnson, LLP

(57) ABSTRACT

A storage bin and a method of are disclosed herein. The disclosed storage bin generally includes a top wall including a top hatch and one or more vent members; a first side wall, a second side wall, a third side wall and a fourth side wall extending from the top wall; and a funnel-shaped bottom portion extending from the side walls, wherein the bottom portion further includes a bottom hatch and a valve member. The disclosed storage bin may be utilized to store proppant and like materials.

22 Claims, 8 Drawing Sheets

(56) References Cited

U.S. PATENT DOCUMENTS

| | | |
|---|---|---|
| 2012/0219391 A1 | 8/2012 | Teichrob et al. |
| 2013/0022441 A1 | 1/2013 | Uhryn et al. |
| 2013/0087217 A1* | 4/2013 | Ness .............. B65D 25/00 137/315.01 |
| 2013/0161211 A1* | 6/2013 | Oren .............. B65D 88/32 206/221 |
| 2014/0023463 A1 | 1/2014 | Oren |
| 2014/0023464 A1 | 1/2014 | Oren et al. |
| 2014/0023465 A1 | 1/2014 | Oren et al. |
| 2014/0083554 A1* | 3/2014 | Harris ............ B65D 88/32 141/1 |
| 2014/0252024 A1* | 9/2014 | Osborne .......... B65D 88/28 222/23 |

\* cited by examiner

STORAGE BIN AND METHOD OF USE

CROSS-REFERENCE TO RELATED APPLICATIONS

This application is related to and claims priority from earlier filed U.S. Provisional Patent Application No. 62/014,206, filed Jun. 19, 2014, the disclosure of which is incorporated herein by reference.

BACKGROUND OF THE INVENTION

1. Field of the Invention

The present invention generally relates to a storage bin and method of use. More specifically, the present invention relates to a storage bin for storage of flowable materials, which include, but are not limited to, proppant used in hydraulic fracturing operations.

2. Description of Related Art

Hydraulic fracturing is widely used in the oil and gas industry to enhance recovery of oil and natural gas. Commonly known as "fracking," hydraulic fracturing is the propagation of fractures in a rock layer by a pressurized fluid. Hydraulic fractures are formed by drilling wellbores into reservoir rock formations and injecting large volumes of fracking fluid under high pressure into the wellbores to create fractures in the rock formations. The injected fluid includes proppant, which is a material, such as grains of sand, ceramic, or other particulates, that keeps the fractures "propped open" when the injection is stopped, thereby allowing oil or natural gas to flow from the formations to the wellbores.

Along with the rapid expansion of hydraulic fracturing operations, the proppant market has grown so fast that field operators, services providers, and material suppliers are struggling to keep up. Managing the proppant supply chain has been one of the biggest challenges facing the proppant market, as the typical proppant supply chain is hundreds, if not thousands, of miles long.

In addition to the long transits, the current process used to deliver proppant to a consumer is subject to many problems that disrupt the efficient flow of proppant to the wellhead. Mines and manufacturing facilities are unable to ship proppant to shale regions that lack adequate transloading and storage facilities on the receiving end of the supply chain. Such transloading facilities must be available to store proppant and transfer it from rail cars for shipment to well sites. If storage facilities are lacking, as they often are due to the high cost of such facilities, significant costs are incurred when proppant is held in railcars. Current rates for rail demurrage are approximately $80 per car per day and nearly double this figure for railroad-owned cars.

Limited storage at transloading facilities has severely limited the efficient operation of these facilities. Service companies are held captive by the current proppant delivery process, as they cannot frack wells without a supply of proppant. As a result, some companies have invested in expensive vertical silo storage facilities to store proppant. A typical silo must be able to store at least 1,500 tons—the approximate minimum amount of proppant needed to tap a single well. A large-scale storage facility may have capacity for 18,000 tons of proppant, which is enough for seven to twelve wells. These silo storage facilities are permanent facilities and require a tremendous investment of time and money to build such storage facilities.

The result of utilizing current storage processes and facilities is the expenditure of hundreds of millions of dollars nationwide in largely unnecessary logistics costs. Such costs result in lost revenue and productivity for mine owners and proppant manufacturers, as well as higher prices for proppant buyers in the destination region.

Currently, a need exists for an inexpensive storage solution for proppant, improved efficiency of the transloading process, and reduced rail and/or truck demurrage charges. Additionally, affordable storage facilities are needed that can be quickly erected and easily taken down or moved if desired.

In view of the foregoing, it is apparent that a need exists in the art for a storage bin and method of use which overcomes, mitigates or solves the above problems in the art. It is a purpose of this invention to fulfill this and other needs in the art which will become more apparent to the skilled artisan once given the following disclosure.

OBJECTS AND SUMMARY OF THE INVENTION

It is an object of the present invention to overcome the above described drawbacks associated with current proppant storage devices and methods. To achieve these and other advantages and in accordance with the purpose of the invention, as embodied and broadly described, the present disclosure describes an economical storage bin and process for storing proppant and like materials.

By utilizing a reconfigured intermodal container, the disclosed device can be used as a storage bin for storing any type of flowable materials such as proppant, sand, grains, powders, liquids, etc. The disclosed storage bin generally comprises a top wall including a top hatch and one or more vent members; a first side wall, a second side wall, a third side wall, and a fourth side wall extending downwardly from the top wall; and a bottom portion extending downwardly from the side walls, the bottom portion comprising a first lower side wall, a second lower side wall, a third lower side wall, and a fourth lower side wall, wherein said lower side walls are angled towards one another to form a funnel-shaped bottom portion; wherein the bottom portion further includes a bottom hatch and a valve member. The disclosed device may further comprise a support structure for supporting the storage bin in an upright vertical position.

The disclosed storage bin provides many advantages over current storage facilities used to store proppant and other flowable materials. Unlike current storage facilities, the present device is designed to be an inexpensive storage solution. A further advantage is that the disclosed storage bins can be quickly erected and easily taken down or moved if desired.

Another advantage is that the disclosed storage bins will improve the efficiency of the transloading process and reduce or eliminate rail and/or truck demurrage charges. Using current systems, proppant is loaded into railcars and transported to a desired location. The proppant is then stored in the railcars until the proppant is needed for fracking. Storing proppant in railcars until it is needed for fracking is extremely expensive, especially considering demurrage fees. The disclosed system eliminates the need to store proppant in railcars and/or trucks and thereby allows companies to avoid incurring costly demurrage fees. Using the disclosed storage bins, proppant is transported to the desired location via railcars and once at the desired location, the proppant is immediately unloaded from the railcars, as described in detail below, and stored in the disclosed storage bins. The disclosed system thereby eliminates the need for expensive silos and elevator systems to remove proppant from railcars and to store the proppant in storage bins.

These, together with other objects of the invention, along with various features of novelty that characterize the invention, are pointed out with particularity in the claims annexed hereto and forming a part of this disclosure. For a better understanding of the invention, its operating advantages, and the specific objects attained by its uses, reference should be had to the accompanying drawings and descriptive matter in which there is described illustrative embodiments of the invention.

BRIEF DESCRIPTION OF THE DRAWINGS

The accompanying drawings, which are incorporated in and form a part of the specification, illustrate embodiments of the present invention, and together with the description, serve to explain the principles of the invention. It is to be expressly understood that the drawings are for the purpose of illustration and description only and are not intended as a definition of the limits of the invention. In the drawings.

DETAILED DESCRIPTION OF ILLUSTRATIVE EMBODIMENTS

Referring now to FIGS. 1-8, exemplary embodiments of a storage bin 10 and methods of use in accordance with the present disclosure are illustrated.

Figure 3:
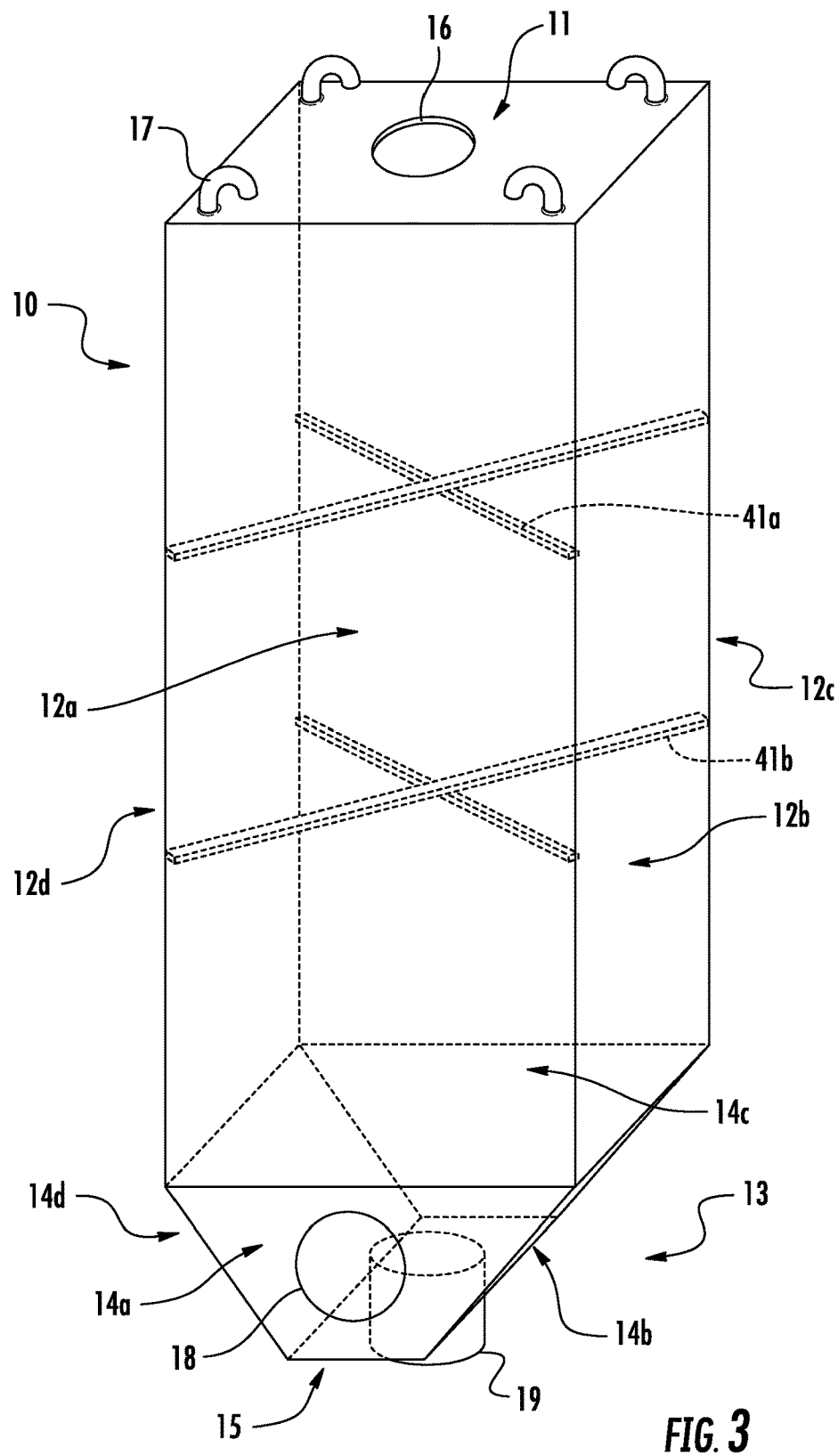
FIG. 3 is a perspective view of a storage bin constructed in accordance with the teachings of the present disclosure.

Turning to FIG. 3, a storage bin 10 according to the present disclosure is illustrated and generally includes a top wall 11 including a top hatch 16 and one or more vent members 17; a first side wall 12a, a second side wall 12b, a third side wall 12c, and a fourth side wall 12d extending downwardly from the top wall 11; and a bottom portion 13 extending downwardly from the side walls, the bottom portion 13 comprising a first lower side wall 14a, a second lower side wall 14b, a third lower side wall 14c, and a fourth lower side wall 14d, wherein said lower side walls are angled towards one another to form a funnel-shaped bottom portion 13; and wherein the bottom portion 13 further includes a bottom hatch 18 and a valve member 19. The bottom portion may further include a bottom wall 15 connecting said first lower side wall 14a, said second lower side wall 14b, said third lower side wall 14c, and said fourth lower side wall 14d. The valve member 19 may be disposed in said bottom wall, as shown in FIG. 3.

In one of the embodiments contemplated by the present disclosure, the interior surfaces of the side walls 12a, 12b, 12c, and 12d and the lower side walls 14a, 14b, 14c and 14d of the bin 10 are coated with a polymeric coating, which can be applied at a relative thickness that is thick enough to prevent flowable materials from seeping through any minute openings in the storage bin 10. Such a coating better equips the storage bin 10 to store flowable materials, such as proppant, without allowing the materials to escape from the bin 10. Various polymeric coating compositions may be used in accordance with the present disclosure. Specific examples of acceptable polymers include polyurethanes, polyureas, and combinations and blends thereof. For example, two-component elastomeric polyurethanes, two-component elastomeric polyureas, and two-component polyurethane/polyurea hybrid or blend systems can be used to coat the interior surfaces of the side walls 12a, 12b, 12c, and 12d and the lower side walls 14a, 14b, 14c and 14d of the storage bin 10 in accordance with the present disclosure. These compositions may be applied from a two-part composition, such as by using specialized sprayers that admix multiple parts together immediately prior to application to the interior surfaces of the side walls 12a, 12b, 12c, and 12d and the lower side walls 14a, 14b, 14c and 14d. One suitable composition is a polyurea composition sold by Rhino Linings Corporation, that is known by the trademark Rhino Extreme™ HP 11-50. Fiberglass coatings may also be used to coat the interior surfaces of the side walls 12a, 12b, 12c, and 12d and the lower side walls 14a, 14b, 14c and 14d of the bin 10.

Figure 6:
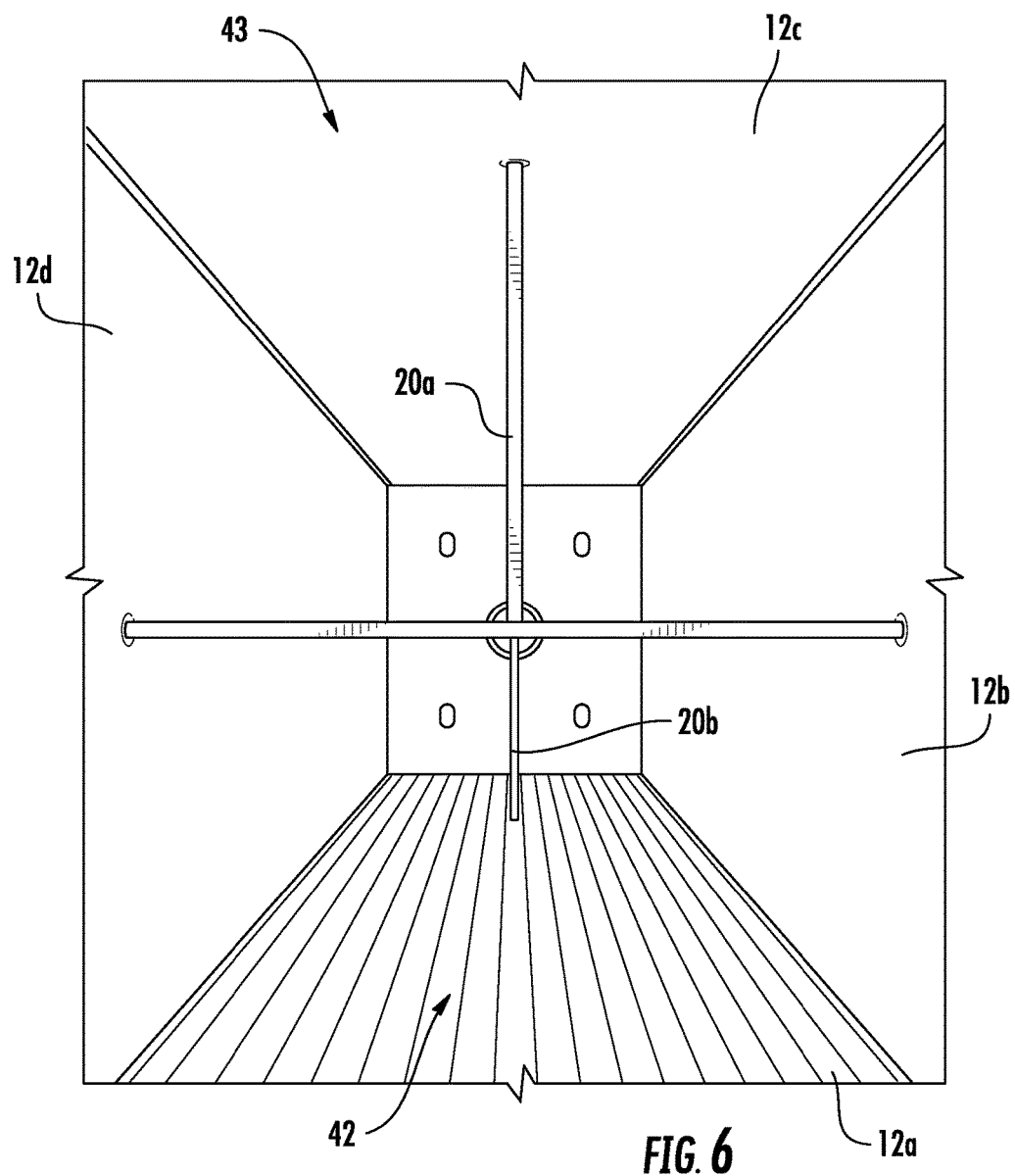
FIG. 6 is a perspective view of the interior of a storage bin constructed in accordance with the teachings of the present disclosure.

As shown in FIGS. 3 and 6, the storage bin 10 disclosed herein may further comprise one or more support bracing members. In one of the embodiments contemplated by the present disclosure, the support bracing member is made with square tubing which is arranged and configured in the interior of the bin 10 to reinforce the side walls 12a, 12b, 12c, and 12d and to give added support to the bin 10 in order to support the weight of the proppant or like materials stored in the storage bin 10 when the storage bin 10 is stood in an upright vertical position, as illustrated in FIGS. 1-3 and 7-8. In one embodiment contemplated by the present disclosure and illustrated in FIG. 3, the one or more support bracing members 41a and 41b are configured in a cross shape and attached to all four interior side walls 12a, 12b, 12c, and 12d of the bin 10. In another embodiment illustrated in FIG. 6, the support bracing members 20a and 20b are configured in a T-shape, wherein the T-shaped support bracing members are each attached to three of the four side walls. Each bin may include one or more support bracing members as needed to reinforce the side walls 12a, 12b, 12c, and 12d.

Figure 4:
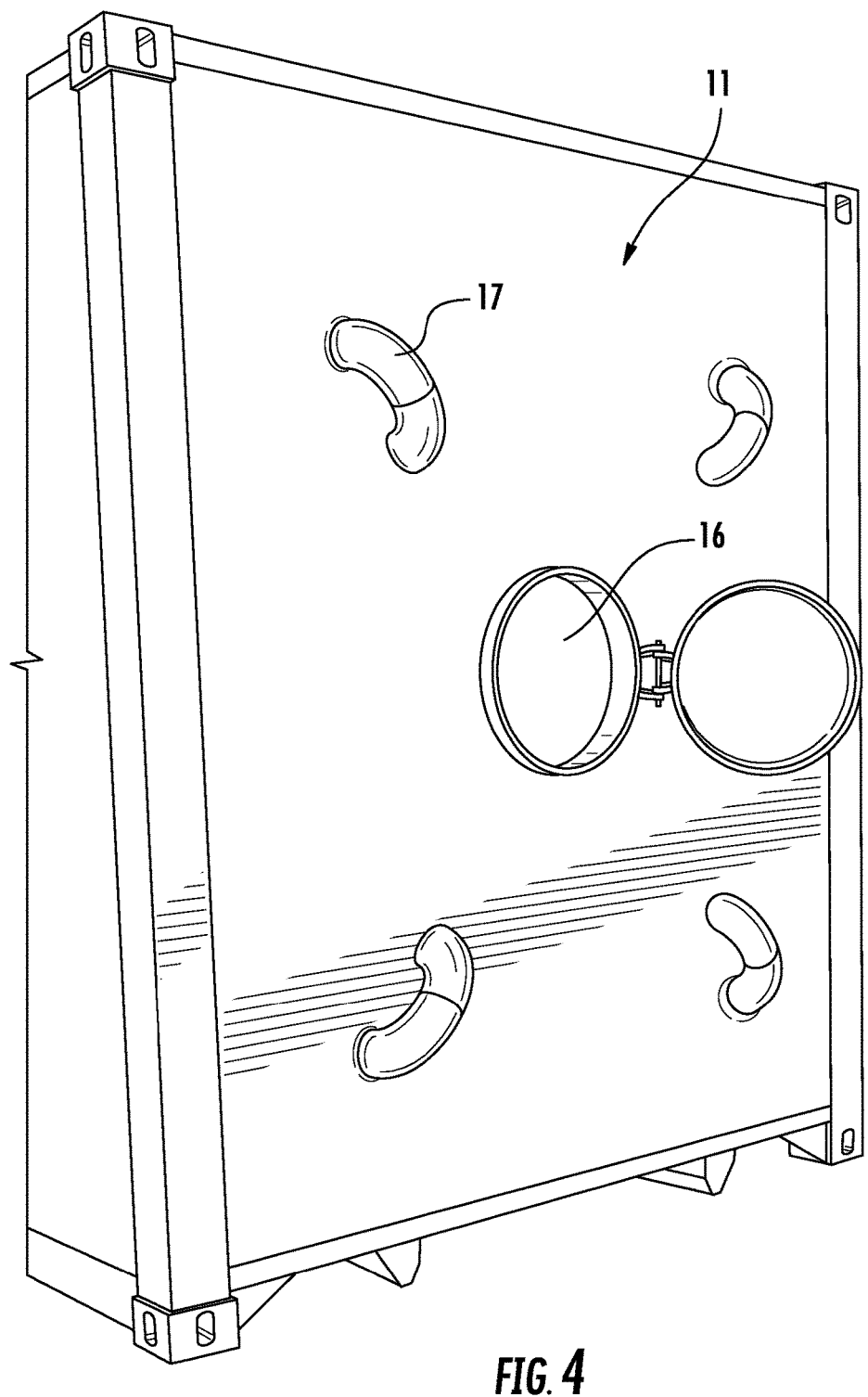
FIG. 4 is a top view of a storage bin constructed in accordance with the teachings of the present disclosure.

As mentioned above, the top wall 11 of the storage bin 10 according to the present disclosure includes a top hatch 16 and one or more vent members 17. In the embodiments depicted in FIGS. 3 and 4, the top wall 11 of the storage bin 10 includes four vent members 17; however, other embodiments are contemplated wherein greater or lesser numbers of vent members 17 are utilized. The vent members 17 provide proper ventilation when transferring proppant or like materials out of the storage bin 10. Without the vent members 17, the disclosed storage bins 10 would collapse when the bottom valve 19 is opened to transfer materials out of the storage bin 10. In a preferred embodiment, the vent members 17 include an opening that faces downwardly in order to prevent foreign matter (e.g., rain, dirt, insects, etc.) from contaminating materials being stored in the storage bin 10. For example, U-shaped vent members 17 may be utilized, as depicted in FIGS. 3 and 4.

The top hatch 16 is configured so that when it is opened, flowable materials can be received through the top hatch 16 into the interior of the storage bin 10. The top hatch 16 may further include a mesh wire covering, which covers the opening of the top hatch 16 and is configured to allow the desired materials (e.g., proppant) through the top hatch 16 while preventing any unacceptable foreign objects or materials (e.g., dirt, insects, other materials, etc.) from entering the interior of the storage bin 10.

As previously mentioned, the disclosed storage bin 10 includes a first side wall 12a, a second side wall 12b, a third side wall 12c, and a fourth side wall 12d extending downwardly from the top wall 11. As shown in FIGS. 1-3 and 7-8, it is desirable to stand the storage bin 10 in an upright vertical position. When the disclosed storage bins are stood in an upright vertical position, it is preferable that the height of each storage bin is equal to at least three times the width of each side wall 12a, 12b, 12c, or 12d.

Figure 5:
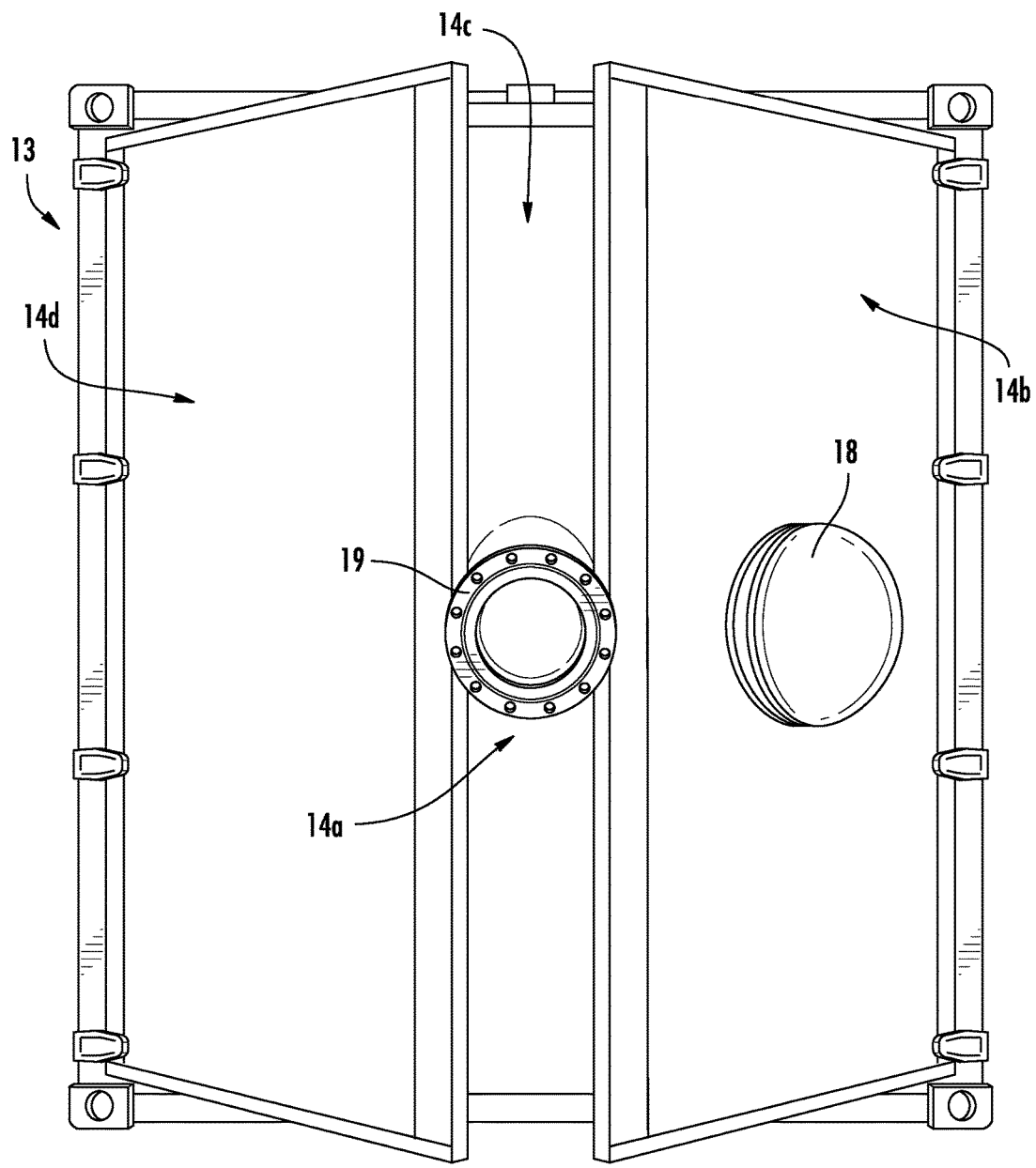
FIG. 5 is a bottom view of a storage bin constructed in accordance with the teachings of the present disclosure.

Turning to FIGS. 3 and 5, the disclosed storage bin 10 comprises a bottom portion 13 extending downwardly from the side walls 12a, 12b, 12c, and 12d, wherein the bottom portion 13 comprises a first lower side wall 14a, a second lower side wall 14b, a third lower side wall 14c, and a fourth lower side wall 14d. The lower side walls 14a, 14b, 14c and 14d are angled towards one another to form a funnel-shaped bottom portion 13. The bottom portion 13 further includes a bottom hatch 18 for clean out and inspection, as well as a valve member 19 for unloading the materials stored in the storage bin 10. The valve member 19 maybe configured with manually operated valves, air operated valves, hydraulically operated valves, or it may define slide style hopper doors.

The disclosed storage bin 10 may further include a mixing cone (not illustrated) installed in the lower interior portion of the storage bin 10, wherein the mixing cone is arranged and configured to maintain a predetermined mix of mesh size of the materials (e.g., proppant) stored in the storage bin 10. The mixing cone can be configured into any shape or style deemed necessary to provide even particle distribution for the desired type of material.

Figure 1:
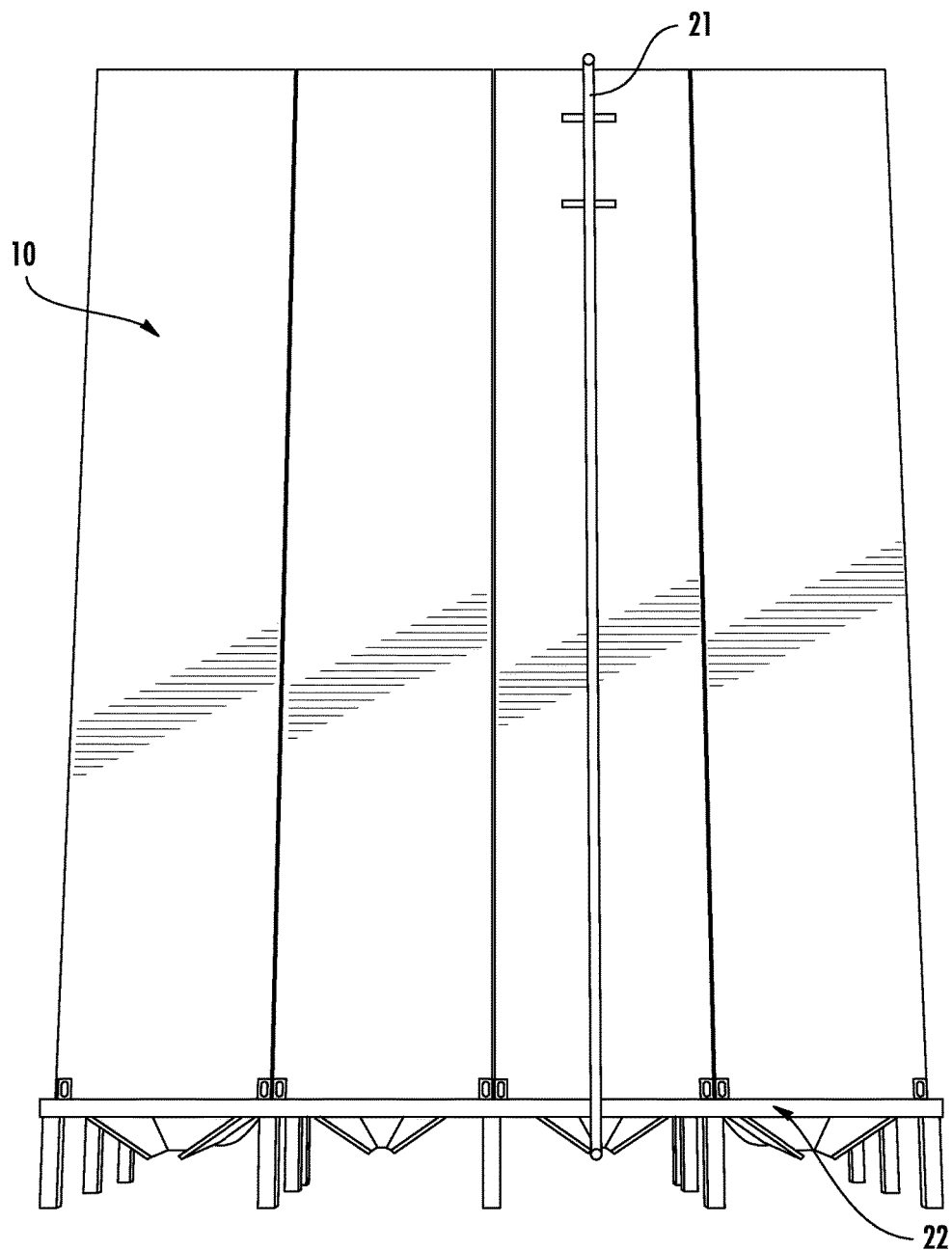
FIG. 1 is a front perspective view of multiple storage bins constructed in accordance with the teachings of the present disclosure.
Figure 2:
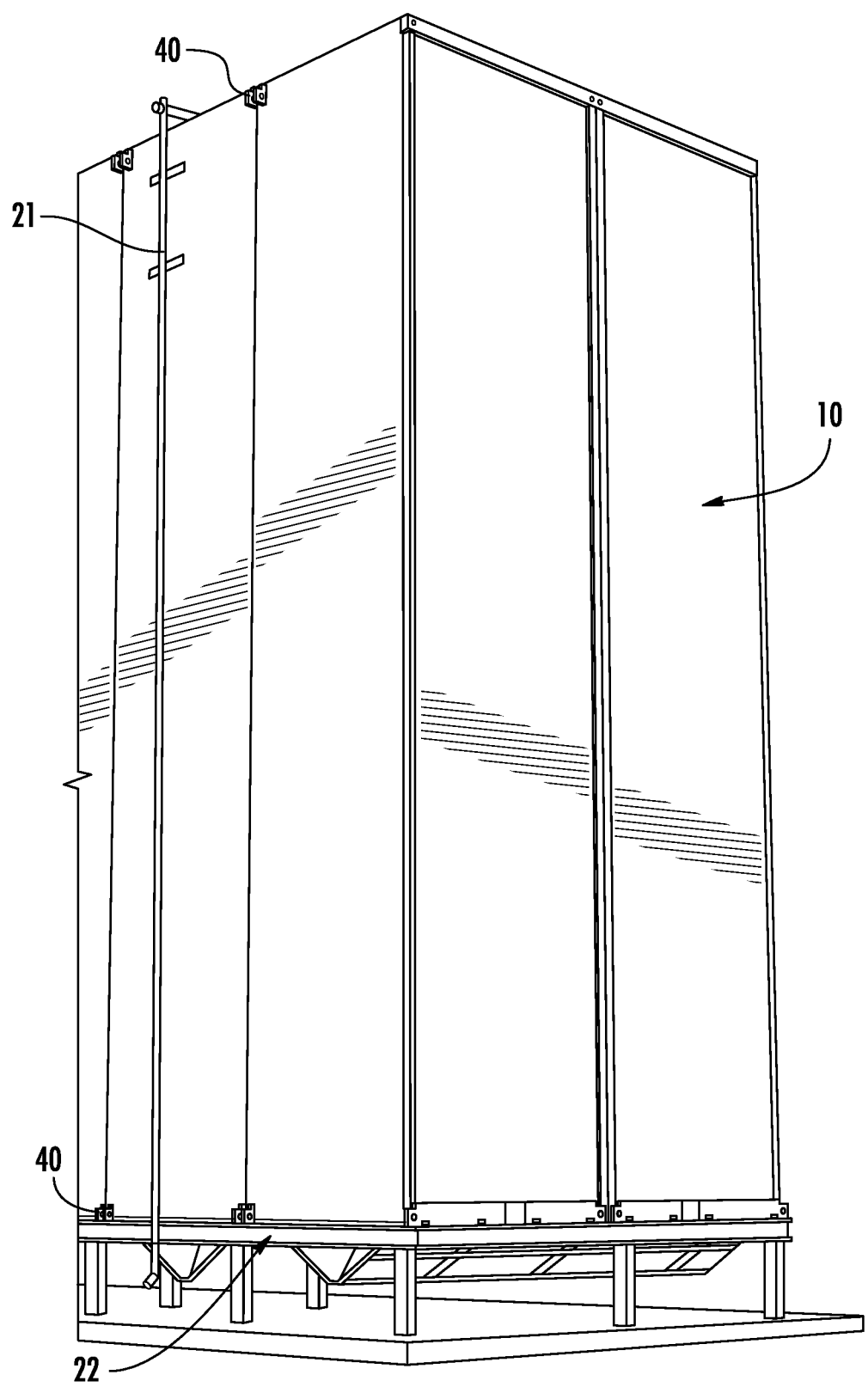
FIG. 2 is a side perspective view of multiple storage bins constructed in accordance with the teachings of the present disclosure.

As illustrated in FIGS. 1 and 2, the disclosed storage bin 10 may further comprise a support structure 22 for supporting the storage bin 10 in an upright vertical position. The support structure 22 can be constructed to be permanent, stationary or portable. In one of the embodiments contemplated by the present disclosure, the support structure 22 is made of I-beam that is arranged and configured to support one or more storage bins 10 in an upright vertical position. Such a support structure 22 provides the proper support and load capacity to hold a fully loaded storage bin 10 in a stationary, upright position.

The disclosed storage bin 10 is designed so that it can be interlocked with other storage bins 10 or stand by itself The storage bin 10 may include fasteners 40 for interlocking with adjacent fasteners 40 on adjacent storage bins 10, such that two or more storage bins 10 may be interlocked together in an upright vertical position. For permanent or stationary storage bins 10, the interlock fasteners 40 maybe welded together to interlock multiple bins 10 together. For portable storage bins 10, the interlock fasteners 40 may include pins, clips, or bolt fasteners to allow for temporary set up.

In one embodiment contemplated by the present disclosure wherein the support structure 22 is constructed to be a permanent structure, the storage bin 10 is affixed to a support structure 22 that is partially encased in a concrete slab. In other embodiments wherein the support structure 22 is not permanently mounted in place, the support structure 22 can be attached to any hard, level surface which provides sufficient support for the support structure 22 and the supported storage bin 10.

In the embodiments shown in FIGS. 4 and 5, the storage bin 10 is constructed by reconfiguring an intermodal container for storage of proppant and like materials. For example, in one embodiment, an approximately 40 foot by 8 foot by 9.5 foot intermodal container is reconfigured into the disclosed storage bin 10. Other sizes of intermodal containers may be utilized to make the disclosed storage bin 10; however, as mentioned above, it is preferable that the height of each storage bin 10 is equal to at least three times the width of one of the side walls 12a, 12b, 12c, or 12d of the storage bin 10, when the storage bin 10 is positioned in an upright vertical position, as shown in the attached drawings.

An intermodal container can be reconfigured into the disclosed storage bin 10 by a method comprising the following steps: attaching one or more support bracing members (e.g., 20a, 20b, 41a, or 41b) in the interior of the container to support the side walls 12 of the storage bin 10; affixing (e.g., by welding) the bottom doors 14b and 14d of the container open at an approximately 30 degree angle thereby forming two lower side walls 14b and 14d; fabricating additional lower side walls 14a and 14c to enclose the bottom portion of the bin; installing a bottom hatch 18 in the bottom portion 13 of the bin 10, for example installing the bottom hatch in the second lower side wall 14b, as depicted in FIG. 5; installing a valve member 19 in the bottom portion 13 of the bin 10, for example installing the valve member such that the valve member is partially disposed in the first lower side wall 14a and the valve member is partially disposed in the third lower side wall 14c, as shown in FIG. 5; installing a top hatch 16 in the top wall 11 of the bin 10; installing one or more vent members 17 in the top wall 11 of the bin 10; and standing the storage bin 10 in an upright vertical position such that the original door opening of the intermodal container forms the bottom portion 13 of the storage bin 10.

As shown in the embodiment pictured in FIG. 5, two of the lower side walls 14b and 14d may define the original two doors of an intermodal container. In this embodiment, the doors may be reconfigured by welding reinforced steel to affix the doors open at an approximately 30 degree angle. Additional plate steel and flat bar, or any other appropriate materials, may then be used to form the two additional lower side walls 14a and 14c and to enclose and seal off the bottom portion 13 of the storage bin 10. As shown in FIG. 5, the two additional lower side walls 14a and 14c enclose and seal off the bottom portion 13 of the storage bin 10 around the valve member 19, which is disposed in the first lower side wall 14a and in the third lower side wall 14c.

As depicted in FIGS. 1 and 2, in one embodiment of the disclosed invention, it is desirable to use multiple storage bins 10 grouped together in upright vertical positions. In the embodiments in which reconfigured intermodal containers are used, one of the side walls 12a, 12b, 12c, or 12d of each bin 10 defines the original floor 42 of the intermodal container and one of the side walls 12a, 12b, 12c, or 12d of each bin 10 defines the original ceiling 43 of the intermodal container. The floors 42 of intermodal containers are typically reinforced with a wood flooring 42. When such intermodal containers are used, the reinforced floor 42 of the intermodal container should face outwardly to form an outer side wall, and the original ceiling 43 of the intermodal container should face inwardly so that it is adjacent to and reinforced by another wall 12a, 12b, 12c, or 12d of an adjacent storage bin 10.

As depicted in FIGS. 1 and 2, the disclosed storage bin 10 may further comprise one or more blow-off tubes 21 attached to the storage bin 10. The blow-off tubes 21 can be used to load proppant or other materials into the storage bin 10. Each storage bin 10 can be configured to include multiple blow-off tubes 21 per bin 10. The blow-off tubes 21 may be disposed within the interior of the storage bin 10 or the blow-off tubes 21 may be attached to the exterior of the storage bin 10, as depicted in FIGS. 1 and 2.

The blow-off tubes 21 can be attached to the storage bin 10 using permanent mounting brackets, a removable tube configuration, or an internal mounting configuration. In one of the embodiments contemplated by the present disclosure, each blow-off tube 21 is attached to the exterior of the storage bin 10 and is constructed out of steel pipe. Each blow-off tube 21 may include a male quick-connect fitting on a first end of the blow-off tube 21 that is preferably located approximately 4 feet above ground level. The quick-connect fitting can be attached to a hose in order to receive proppant or like materials through the blow-off tube 21. The second end of the blow-off tube 21 may be bent at an approximately 30 degree angle to allow the materials (e.g., proppant or the like) to be blown into the top of the storage bin 10 through the top hatch 16 and fall into the interior of the bin 10.

Figure 7:
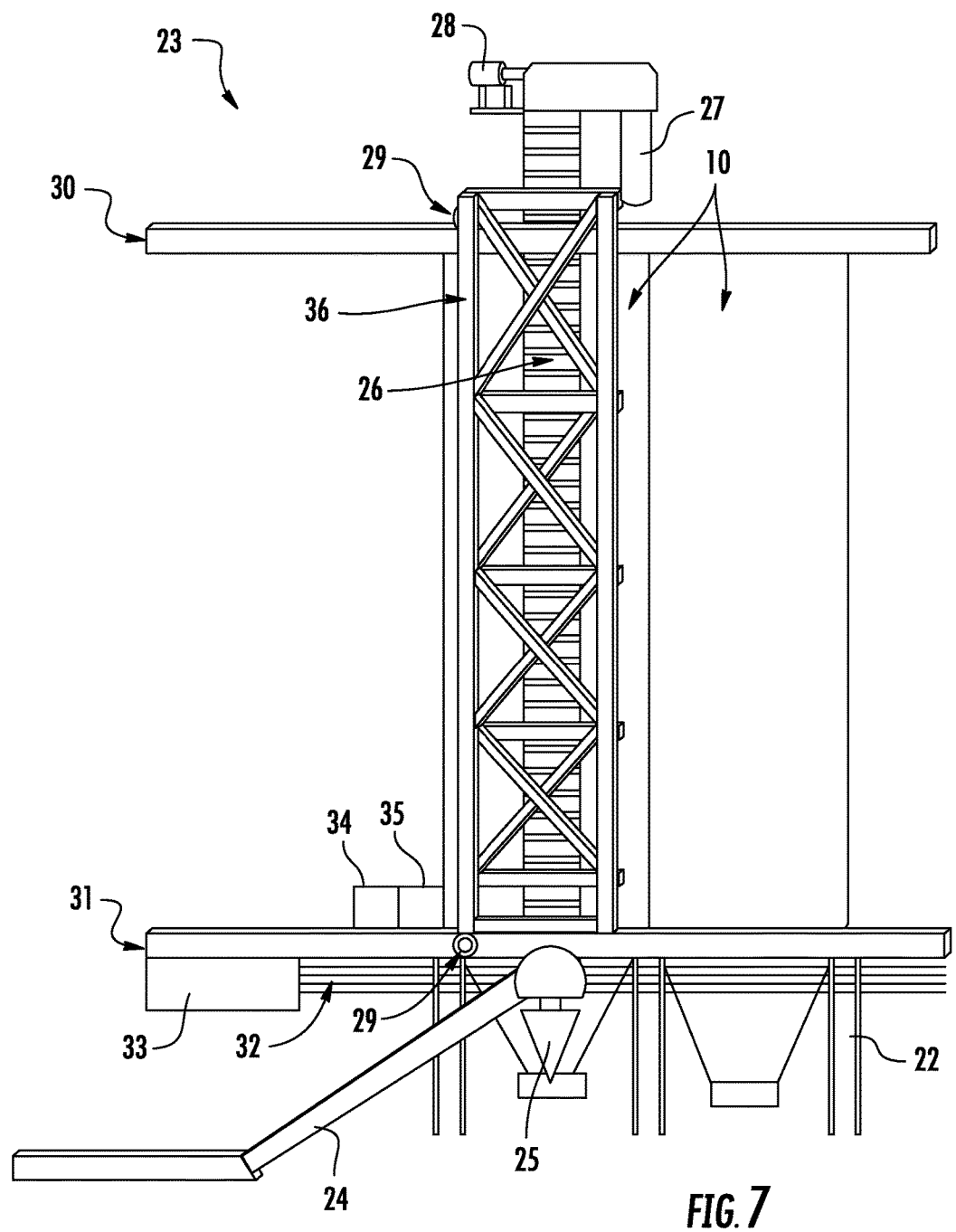
FIG. 7 is a front view of two storage bins and an elevator system constructed in accordance with the teachings of the present disclosure.
Figure 8:
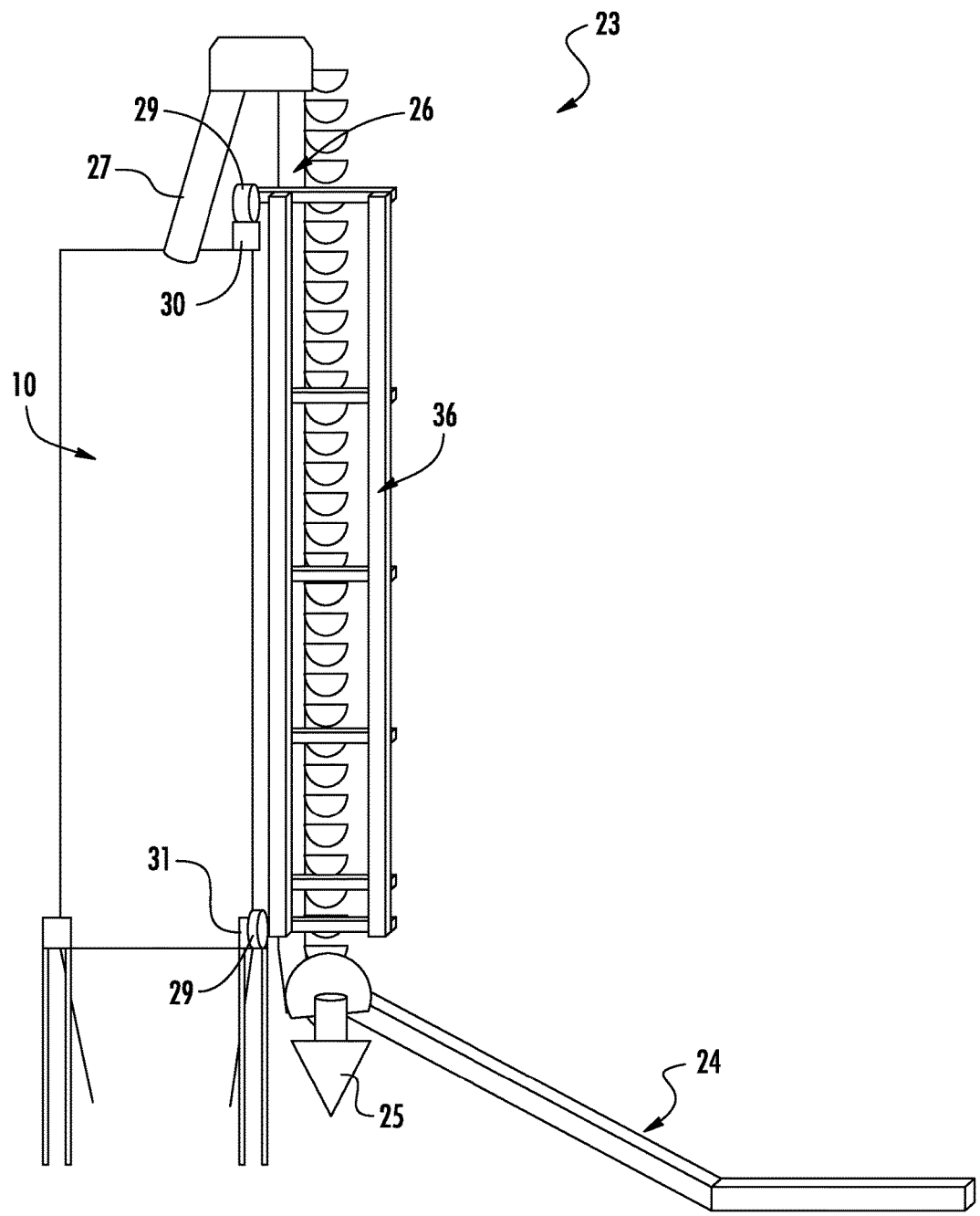
FIG. 8 is a side view of a storage bin and an elevator system constructed in accordance with the teachings of the present disclosure.

Alternatively, as shown in FIGS. 7 and 8, the disclosed device may include an elevator system 23 for loading proppant into one or more storage bins 10. The elevator system 23 comprises a belt conveyor system 24 configured for bulk material handling and used to transport large volumes of materials from a truck or rail car to each bin 10. The elevator system 23 additionally comprises a bucket conveyor system 26, which receives materials from the belt conveyor system 24 into a hopper 25 and transports the materials in the bucket conveyor system 26 up the height of the bins 10 and into the top of each bin 10, releasing the materials into the top hatch 16 of each bin 10 through a down spout 27 of the bucket conveyor system 26. The bucket conveyor system 26 comprises buckets to carry materials up the height of the bins, a belt to carry the buckets and transmit a pull, a drive member 28 (e.g., an electric motor) to drive the belt, and accessories for loading the buckets and for maintaining the belt tension. The elevator system 23 depicted in FIGS. 7 and 8 additionally comprises a top track 30 disposed near the top of the bins 10 and a bottom track 31 disposed near the bottom of the bins 10. Drive wheels 29 run along the top track 30 and the bottom track 31, pushing a support system 36 and the bucket conveyor system 26 along the top track 30 and the bottom track 31. In this manner, the bucket conveyor system 26 can be pushed along a row of bins 10, filling up each bin 10 before moving on to an adjacent bin 10. Hydraulic power 35 may be used to operate the bucket conveyor system 26 and the belt conveyor system 24. A control box 34 may be included for operation of hydraulic motors included in the bucket conveyor system 26, the belt conveyor system 24, and to operate the drive wheels 29. The elevator system 23 may also include electric power lines 32 that run along the bottom of the system 23, as shown in FIG. 7, which power lines 32 may be enclosed by a protective cover 33.

It is important to note that the construction and arrangement of the elements of the invention provided herein are illustrative only. Although only a few exemplary embodiments of the present invention have been described in detail in this disclosure, those skilled in the art who review this disclosure will readily appreciate that many modifications are possible in these embodiments (such as variations in orientation of the components of the system, sizes, structures, shapes and proportions of the various components, etc.) without materially departing from the novel teachings and advantages of the invention.

Though the disclosed storage bin is primarily described in the accompanying disclosure with its application for use with proppant storage, note that it is not intended to limit the spirit and scope of the present invention solely for use in conjunction with storage of proppant. The disclosed storage bins may be utilized to store many different materials and the storage bins may be used in a wide range of industries and applications.

Many other uses of the present invention will become obvious to one skilled in the art upon acquiring a thorough understanding of the present invention. Once given the above disclosures, many other features, modifications and variations will become apparent to the skilled artisan in view of the teachings set forth herein. Such other uses, features, modifications and variations are, therefore, considered to be a part of this invention, the scope of which is to be determined by the following claims.

The invention claimed is:

1. A storage bin for storing flow able materials, said storage bin comprising:
   a top wall including a top hatch and one or more vent members, said top hatch being configured to receive said flow able materials therethrough, and said vent members being configured to allow air to travel into said bin when transferring said materials out of said bin;
   a first side wall, a second side wall adjacent to said first side wall, a third side wall adjacent to said second side wall, said third side wall being disposed opposite of said first side wall, and a fourth side wall adjacent to said first side wall and adjacent to said third side wall, said fourth side wall being opposite of said second side wall, wherein said first side wall, said second side wall, said third side wall and said fourth side wall all extend downwardly from said top wall; and
   a bottom portion extending downwardly from said side walls, said bottom portion comprising a first lower side wall being adjacent to and extending downwardly from said first side wall, a second lower side wall being adjacent to and extending downwardly from said second side wall, a third lower side wall being adjacent to and extending downwardly from said third side wall, and a fourth lower side wall being adjacent to and extending downwardly from said fourth side wall, wherein said lower side walls are angled towards one another to forma funnel-shaped bottom portion, and wherein said bottom portion further includes a bottom hatch disposed in said second lower side wall and wherein said bottom portion further includes a valve member disposed in said first lower side wall, said valve member being configured to open to release said materials out of said bin.

2. The storage bin according to claim 1, further comprising:
   a first support bracing member including a first end attached to said first side wall, a second end attached to said second side wall, and a third end attached to said third side wall; and a second support bracing member including a first end attached to said first side wall, a second end attached to said third side wall, and a third end attached to said fourth side wall,
wherein said first support bracing member and said second support bracing member are arranged and configured to reinforce said first side wall, said second side wall, said third side wall, and said fourth side wall, and
wherein said first side wall runs parallel to said third side wall and said second side wall runs parallel to said fourth side wall.

3. The storage bin according to claim 1, wherein interior surfaces of said first side wall, said second side wall, said third side wall and said fourth side wall, and interior surfaces of said first lower side wall, said second lower side wall, said third lower side wall and said fourth lower side wall are coated with a polymeric coating.

4. The storage bin according to claim 3, wherein said polymeric coating is selected from a group consisting of a two-component polyurethane, a two-component polyurea, and a two-component polyurethane/polyurea hybrid system.

5. The storage bin according to claim 1, wherein said storage bin is stood in an upright vertical position and wherein the height of said side walls is equal to at least three times the width of one of said side walls.

6. The storage bin according to claim 1, further comprising a mixing cone arranged and configured in a lower interior portion of said storage bin, wherein said mixing cone is arranged and configured to maintain a predetermined mix of mesh size of said materials stored in said storage bin.

7. The storage bin according to claim 1, further comprising a support structure for supporting said storage bin in an upright vertical position wherein the height of said side walls is equal to at least three times the width of one of said side walls.

8. The storage bin according to claim 7, wherein said support structure is at least partially encased in a concrete slab.

9. The storage bin according to claim 1, further comprising a plurality of fasteners for interlocking said storage bin with a plurality of adjacent fasteners on one or more adjacent storage bins, wherein said storage bins are fastened together in an upright vertical position.

10. The storage bin according to claim 1, further comprising one or more blow-off tubes attached to said storage bin, said blow-off tubes being arranged and configured to load said materials into said storage bin.

11. The storage bin according to claim 10, wherein said one or more blow-off tubes are disposed within the interior of said storage bin.

12. The storage bin according to claim 10, wherein said one or more blow-off tubes are attached to the exterior of said storage bin.

13. The storage bin according to claim 12, wherein said one or more blow-off tubes includes a quick-connect fitting on a first end of said blow-off tube and a second end of said blow-off tube is bent at an approximately 30 degree angle towards said top hatch of said storage bin, wherein said materials can be received through said first end of said blow-off tube and said materials can be released through said second end of said blow-off tube, thereby allowing said materials to be blown into said storage bin through said top hatch.

14. The storage bin according to claim 1, further comprising an elevator system arranged and configured to load said materials into said storage bin, said elevator system comprising:

a belt conveyor system arranged and configured to transport said materials to said bin; and
a bucket conveyor system arranged and configured to receive said materials from said belt conveyor system, said bucket conveyor system comprising buckets to carry said materials up the height of said bin, a belt to carry the buckets and transmit a pull, and a drive member to drive said belt,
wherein said bucket conveyor system is configured to receive materials from said belt conveyor system into a hopper, to transport said materials up the height of said bin via said buckets, and to release said materials through a down spout into the top of said bin through said top hatch.

15. The storage bin according to claim 14, wherein said elevator system further comprises:
a top track disposed near the top of said bin;
a bottom track disposed near the bottom of said bin;
a support system slidably connected to said top track and to said bottom track, said support system being arranged and configured to connect to and support said bucket conveyor system in a manner which provides for horizontal movement of said support system and said bucket conveyor system; and
drive wheels arranged and configured to run along said top track and said bottom track in order to move said support system and bucket conveyor system along said top track and said bottom track.

16. The storage bin according to claim 15, further comprising more than one of said storage bins lined up in a row, wherein said elevator system is arranged and configured to push said bucket conveyor system along said row of said bins in order to load one of said bins before moving into a position to load another adjacent bin in said row of said bins.

17. The storage bin according to claim 1, wherein said valve member is disposed in said third lower side wall.

18. A storage bin for storing flowable materials, said storage bin comprising:
a top wall including a top hatch and one or more vent members, said top hatch being configured to receive said flowable materials therethrough, and said vent members being configured to allow air to travel into said bin when transferring said materials out of said bin;
a first side wall, a second side wall, a third side wall and a fourth side wall extending downwardly from said top wall; and
a bottom portion extending downwardly from said side walls, said bottom portion comprising a first lower side wall, a second lower side wall, a third lower side wall and a fourth lower side wall, said bottom portion further comprising a bottom wall connecting said first lower side wall, said second lower side wall, said third lower side wall, and said fourth lower side wall, wherein said lower side walls are angled towards one another to form a funnel-shaped bottom portion, and wherein said bottom portion further includes a bottom hatch and a valve member, said bottom hatch being disposed in said first lower side wall, and said valve member being disposed in said bottom wall, said valve member being configured to open to release said materials out of said bin.

19. A storage bin for storing flowable materials, said storage bin comprising:
a reconfigured intermodal container, including
a top wall including a top hatch and one or more vent members, said top hatch being configured to receive said flowable materials therethrough, and said vent members being configured to allow air to travel into said bin when transferring said materials out of said bin;
a first side wall, a second side wall, a third side wall and a fourth side wall extending downwardly from said top wall; and
a bottom portion extending downwardly from said side walls, said bottom portion comprising:
  a first lower side wall,
  a second lower side wall wherein said second lower side wall is defined by a first original door of said intermodal container, said first original door being affixed open at a predetermined angle to create said second lower side wall,
  a third lower side wall, and
  a fourth lower side wall wherein said fourth lower side wall is defined by a second original door of said intermodal container, said second original door being affixed open at a predetermined angle to create said fourth lower side wall, and
  wherein said lower side walls are angled towards one another to form a funnel-shaped bottom portion, and
  wherein said bottom portion further includes a bottom hatch and a valve member, wherein said first lower side wall and said third lower side wall are fabricated to enclose said bottom portion around said valve member, said valve member being configured to open to release said materials out of said bin.

20. The storage bin according to claim 19, wherein said bottom hatch is disposed in said second lower side wall, and wherein said first lower side wall and said third lower side wall are fabricated around said valve member to enclose said bottom portion such that said valve member is partially disposed in said first lower side wall and said valve member is partially disposed in said third lower side wall.

21. The storage bin according to claim 19, wherein said first side wall defines an original floor of said intermodal container and said third side wall defines an original ceiling of said intermodal container, and wherein a plurality of said bins are stood in an upright vertical position and are fastened together in an arrangement such that said originalfloor of each of said bins faces outwardly to form an outer side wall and said original ceiling of each of said bins is adjacent to and reinforced by another side wall of an adjacent bin.

22. The storage bin according to claim 19, wherein said first door and said second door are affixed open at an approximately 30 degree angle.

* * * * *